(12) United States Patent
Schmidt (10) Patent No.: US 9,635,865 B1
(45) Date of Patent: May 2, 2017

(54) DOUGH FEEDER

(71) Applicant: Norman Schmidt, Surrey (CA)

(72) Inventor: Norman Schmidt, Surrey (CA)

(*) Notice: Subject to any disclaimer, the term of this patent is extended or adjusted under 35 U.S.C. 154(b) by 0 days.

(21) Appl. No.: 14/997,483

(22) Filed: Jan. 16, 2016

(51) Int. Cl.
| | | |
|---|---|---|
| *A21C 3/04* | (2006.01) |
| *B65G 47/18* | (2006.01) |
| *B65G 47/19* | (2006.01) |
| *B65G 47/20* | (2006.01) |
| *B65G 47/44* | (2006.01) |
| *A21C 3/02* | (2006.01) |
| *B65G 15/00* | (2006.01) |
| *B65G 23/44* | (2006.01) |
| *B65G 43/00* | (2006.01) |
| *B65G 45/12* | (2006.01) |
| *B65G 45/10* | (2006.01) |

(52) U.S. Cl.
CPC .............. *A21C 3/024* (2013.01); *B65G 15/00* (2013.01); *B65G 23/44* (2013.01); *B65G 43/00* (2013.01); *B65G 45/10* (2013.01); *B65G 45/12* (2013.01)

(58) Field of Classification Search
CPC .......... A21C 3/024; A21C 3/04; B65G 47/18; B65G 47/19; B65G 47/20; B65G 47/44
USPC .... 198/531, 535, 550.01, 550.2, 550.5, 604, 198/605; 425/137, 239, 322, 363, 373; 264/165, 166; 426/502
See application file for complete search history.

(56) References Cited

U.S. PATENT DOCUMENTS

| | | | | | |
|---|---|---|---|---|---|
| 4,113,819 | A | * | 9/1978 | Hayashi | A21C 3/022 264/171.27 |
| 4,304,326 | A | * | 12/1981 | Fowler | B65G 47/19 198/604 |
| 4,338,341 | A | * | 7/1982 | Glass | A21C 9/00 264/40.7 |
| 4,645,064 | A | * | 2/1987 | Hayashi | A21C 1/14 198/533 |
| 4,741,460 | A | * | 5/1988 | Blain | A21C 15/002 198/771 |
| 4,917,230 | A | * | 4/1990 | Barchman | A21C 9/08 198/434 |
| 4,988,276 | A | * | 1/1991 | Moeller | A21C 5/00 225/103 |
| 5,124,163 | A | * | 6/1992 | Hayashi | A21C 3/04 426/231 |
| 5,266,341 | A | * | 11/1993 | Morikawa | A21C 3/02 425/140 |
| 5,378,133 | A | * | 1/1995 | Atwood | A21C 3/04 425/136 |
| 5,470,599 | A | * | 11/1995 | Ruhe | A23P 20/20 425/141 |
| 5,496,578 | A | * | 3/1996 | Muller | A21C 3/04 198/418.6 |

(Continued)

*Primary Examiner* — Douglas Hess
(74) *Attorney, Agent, or Firm* — Tangent Law Group, PLLC; Eric J. Weierstall, Esq.

(57) ABSTRACT

A device acts to take mixed dough or semi viscous material and feed this material uniformly and progressively to portioning machines that may not have capacity to hold a full batch from the mixer or require to be fed at a required rate so as to maintain a reasonably uniform or stable height or reserve amount of dough in there infeed hopper of dough portioning machine. The device providing two or more selectable output feeds in operation, providing for easy cleaning through detachable components, and compensating in the output feed variable for variations in the volume of dough in the tote.

20 Claims, 7 Drawing Sheets

(56) References Cited

U.S. PATENT DOCUMENTS

| | | | | |
|---|---|---|---|---|
| 5,505,970 | A * | 4/1996 | Morikawa | A21C 3/025 425/140 |
| 5,862,743 | A * | 1/1999 | Cimenti | A21C 5/00 425/321 |
| 5,919,495 | A * | 7/1999 | Fletcher | A21C 5/00 425/238 |
| 6,272,979 | B1 * | 8/2001 | Morikawa | A21C 3/10 425/321 |
| 6,344,227 | B1 * | 2/2002 | Schmidt | A21C 5/003 222/148 |
| 6,523,727 | B2 * | 2/2003 | Lanham, Jr. | A21C 5/00 222/413 |
| 6,524,090 | B1 * | 2/2003 | Hayashi | A21C 3/02 425/140 |
| 6,883,954 | B2 * | 4/2005 | Rothammel | A21C 5/02 366/76.7 |
| 7,077,558 | B2 * | 7/2006 | Bodenstorfer | A21C 7/005 366/76.7 |
| 7,182,588 | B2 * | 2/2007 | Lambauer | A21C 3/04 425/101 |
| 8,926,307 | B1 * | 1/2015 | Rodrigues | A21C 3/04 425/142 |

* cited by examiner

DOUGH FEEDER

CROSS-REFERENCE TO RELATED APPLICATIONS

This application claims the priority of U.S. provisional patent application 62/163,350, filed May 18, 2015, which is incorporated herein by reference.

BACKGROUND OF THE INVENTION

Advancements in food portioning machines have made them more productive so that they can now portion larger quantities of mixed dough or semi viscous material per given unit of time. This brings up a new need for a machine to feed dough to these portioning machines at these larger quantities in an accurate fashion. The field of the instant invention is primarily medium to large scale dough and semi viscous material feeding machines.

In facilities with a mixer and portioning machine but no filling or feeding device the dough or semi viscous material is brought over to the portioning machine where a person takes the dough or semi viscous material by hand out of the mixer bowl or tote and lifts it up and places the dough or semi viscous material in the receiving hopper of the portioner. In the prior art small to medium scale hoists or tote dump systems exist where dough is taken from the mixer in a container, such as a mixing bowl or a tote, which is then lifted and dumped into the portioning machines. This dump or bulk discharge has several short comings, which include but are not limited to, creating a condition where the size of the mixed batch of dough may exceed the capacity of the hopper of the portioning machine or where attempts to partially transfer a portion of the dough in the tote or mixing bowl to the portioner hopper may overfill and spill, making for waste and extra time and labor to clean up spills. Another issue is that the dumping of a full tote or large quantity of dough or semi viscous material all at once into the hopper of the portioning machine may alter the scaling of portions due to the higher head pressure of the dough or semi viscous material being presented to the portioning machine. That causes variations in portion size, weight, and volume of the portions due to the sudden change in the volume of dough in the hopper and resulting increase in the head pressure in the portioning machine hopper.

Inversely, when the dough level starts to drop from the point at which the hopper is significantly full, then the portion size may start to decrease as a result from reduced hopper head pressures. This requires an operator or an automated system to always adjust the portioning machine to compensate for the changing hopper level and associated changing portion sizes. Best practices in the industry dictate that one should feed the dough or semi viscous material at a more constant rate so as to maintain a constant hopper level. When the dough is fed in a more constant rate, which does not occur with these existing bowls or tote lifts or dumpers, the portioning machine will deliver portions of most constant portion size and/or weight.

There also exists in the prior art vessels, such as totes or troughs, with dump gates that are on the bottoms of the vessels or totes and that open completely, partially or can be maintained closed. To provide for a means of a steady delivery rate of mixed dough or semi viscous material a person would need to monitor and adjust the opening of such lower slide gates. The flow out of these totes would vary when the materials in the tote or hopper reduces, or empties, resulting in the rate of its evacuation also decreasing. As an example a full tote will have a faster flow of materials from it because of the higher head pressure due to it being full, therefore one would need to reduce the opening of the dump gate in the bottom of the tote. As dough is taken out of the tote the head pressure and therefore flow out of the tote will decrease requiring an operator to open up the area of the dump gate.

Additionally, as a simplified example of a source of variation and loss of production in these current systems consider the steps required to change a tote when the flow of dough or materials becomes less than the portioning machine requires or consumes, then the tote needs to be taken out and substituted for a new full tote. The changing from a spent tote to a "fresh" or full tote is also typically accompanied by a required stop in production so as to allow for removing the substantially spent tote, removing any or the majority of residual materials from the spent tote and placing them into the next/full/fresh tote, placing the next tote in the hoist, lifting, moving the next/full/fresh tote over the receiving hopper of the portioning machine, restarting the flow of dough or semi viscous material into the portioning machine receiving hopper, waiting for the hopper to refill and then starting the portioning machine back up, removing the first materials from the portioning machine discharge as they will have an inaccurate weight or size then checking and possibly needing to re-calibrate or adjust the portioning machine to provide portions of the desired weight or size. This time loss can reduce the overall production capacity by up to twenty percent, which amounts to a much higher manufacturing cost.

There have been devices made that can feed higher production portioning machines using methods such as auger pumps and "chunkers" but these can have operational issues such as smearing of the chocolate chips in the dough. There are also very large feeders that have a receiving chamber, a pair of counter rotating feed rollers that issue the dough or semi viscous material out in a sheet or slab to be conveyed up to the receiving hopper of the portioning machine. Such devices are available but they are expensive devices and can typically only be justified for use by large scale or high production large scale operations due to these costs. They also require a significant amount of floor space which makes them prohibitive for use in smaller production runs and facilities. These large devices being large and heavy also typically do not come apart for cleaning and so they need to be cleaned in place which is a more time consuming and labor intensive cleaning process.

Simply making a scaled down version of larger machines is not cost effective as it would require the same number of components and manufacturing operations, therefore there would only be cost savings due to reduction of overall materials and manufacturing times. Producing copied smaller scale versions of devices from large production line machines would have costs of eighty to ninety percent of the large scale machines for a required throughput capacity of ¼ to ½ of the large scale machines. This twenty percent reduction in cost would make the scaled down units unacceptable from a cost and floor space perspective.

Therefore a need exists for a device that can feed dough or semi viscous materials efficiently and consistently as well as have a smaller size or require minimal floor space and which is less costly then the large scale machines. The need would also be for a new simpler design that would provide for the required feeding needs for more consistent portioning and throughput but in a simpler and more cost effective manner. The new device can also allow for it to be more easily cleaned by allowing access to all areas that need to be cleaned and where no open access is available, provision is made for simple disassembly so that one can gain cleaning access thru removal of access panels and or partial access where some components could be moved to allow for cleaning access.

SUMMARY OF THE INVENTION

An aspect of the invention is to provide a reliable, cost-effective feeding device for providing a flow of semi-viscous medium or dough to a further processing machine and allowing for different modes of operation to provide different flow output.

A further aspect of the invention is to provide a device that reduces a semi-viscous material to a slab that is either continuous and generally uniform or non-continuous and broken to facilitate a constant output flow of semi-viscous material or dough to a subsequent processing device.

Yet another aspect of the invention is to provide a device for supplying a semi-viscous material or dough slab to a subsequent device and allows for easy disassembly for cleaning and maintenance.

The invention includes an apparatus, a method of operating the apparatus, and a method of cleaning the apparatus for supplying a consistent flow of semi-viscous material.

The apparatus of the invention includes a device for the controlled output feed of semi viscous mediums to a further processing device, the device having a hopper retaining the semi-viscous medium with an at least one feed roller being in contact with the semi-viscous medium in the hopper and operating at a feed roller speed and direction. A conveyor belt separated from the feed roller by a gap spacing and rotating at a conveyor belt speed in the same direction as the feed roller with an at least one motor driving the at least one feed roller and the conveyor belt at the respective feed roller speed and the conveyor belt speed is provided. A sensor sensing the volume of semi-viscous material can be provided along with a gap space between the at least one feed roller and the conveyor belt allowing for the removal of the semi-viscous medium from the hopper as an output flow at a specified rate on the conveyor belt at a specified slab profile with a profile height. A controller controlling the respective feed roller speed and the conveyor belt speed so that the at least one feed roller engages the semi-viscous material in the hopper and drives the material into the gap space between the feed roller and the conveyor belt to create a material feed output, wherein the adjustment of one or more of an at least one of the gap spacing, the speed of the at least one feed roller, and the speed of the conveyor provides at least two modes of operations for the output flow.

The at least one roller can be a plurality of rollers. The controller can further comprise a human interface device with at least one adjustment control. The at least one adjustment control adjusts one or more of an at least one of the speed of the feed roller, the speed of the conveyor, and the gap spacing of the device to a setting. The device can further comprise a programmable logic adapted to store the setting for one or more of the at least one of the speed of the at least one roller, the speed of the conveyor and the gap spacing and memory.

The device can have a first mode of an at least two modes that reduces the semi-viscous material to a generally slab profile output that is generally uniform across the slab and of generally uniform profile height. In the first mode of the at least two modes, the speed of the feed roller and the speed of the conveyor can be nearly equal and this can provide the generally uniform slab. The device can have a second mode of an at least two modes which reduces the semi-viscous material to a generally non-uniform slab. The second mode of an at least two modes the feed roller speed can be varied from the conveyor speed and a difference between the adjusted feed roller speed and the conveyor speed which can result in the non-uniform slab output in the second of the at least two operating modes. In the second mode of an at least two modes the conveyor speed can be varied and a difference between the varied conveyor speed and the speed of the feed roller can result in non-uniform slab output in the second of the at least two operating modes. In the second mode of an at least two modes both the speed of the feed roller and the speed of the conveyor can also be varied and a difference between the speed of the conveyor and the speed of the feed roller can result in the non-uniform slab output in the second of the at least two operating modes.

The at least one motor includes two motors that provide for speed adjustment individually to the feed roller speed and the speed of the conveyor belt. The at least one sensor can sense a low volume in a hopper of the further device and start the device. A signal for high or full in the hopper from the sensor can stop the device. The sensor can also be on the further device being supplied by the device and the further device starts and stops the device when the sensor senses a low or a high volume in the hopper, respectively.

The gap space can also be adjustable. The adjustment of the gap spacing in combination with the variation of one or more of the speed of the conveyor, the speed of feed roller, and the speed of the feed roller and the conveyor determines whether the device can in a first of an at least two operational modes producing a uniform slab profile or a second of an at least two operating modes producing a non-uniform slab profile. The at least one feed roller is a movable at least one feed roller. The at least one movable feed roller has a profiled shape and is slideable upon a feed roller shaft. The device further comprises a removable end plate comprising a wall of the hopper that allows for sanitation access.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

DETAILED DESCRIPTION

The instant invention is directed to but not limited to a device that feeds mixed dough or semi viscous material to portioning machines accurately with reduced costs of production, smaller footprint on a production floor, and easier access for cleaning than existing systems. Typically, in a non-limiting example, this system or device would replace a person who would put their hands into a mixer bowl or tote full of dough or semi viscous materials, scoop out some of the dough or semi viscous material and place it in the hopper of the portioning machine. Or the system could replace a device that takes a tote or container full of dough or semi viscous material contained and then lifts, and then thereafter rotates the bowl or tote so as to dump it into the elevated hopper of a portioning machine.

Figure 1A:
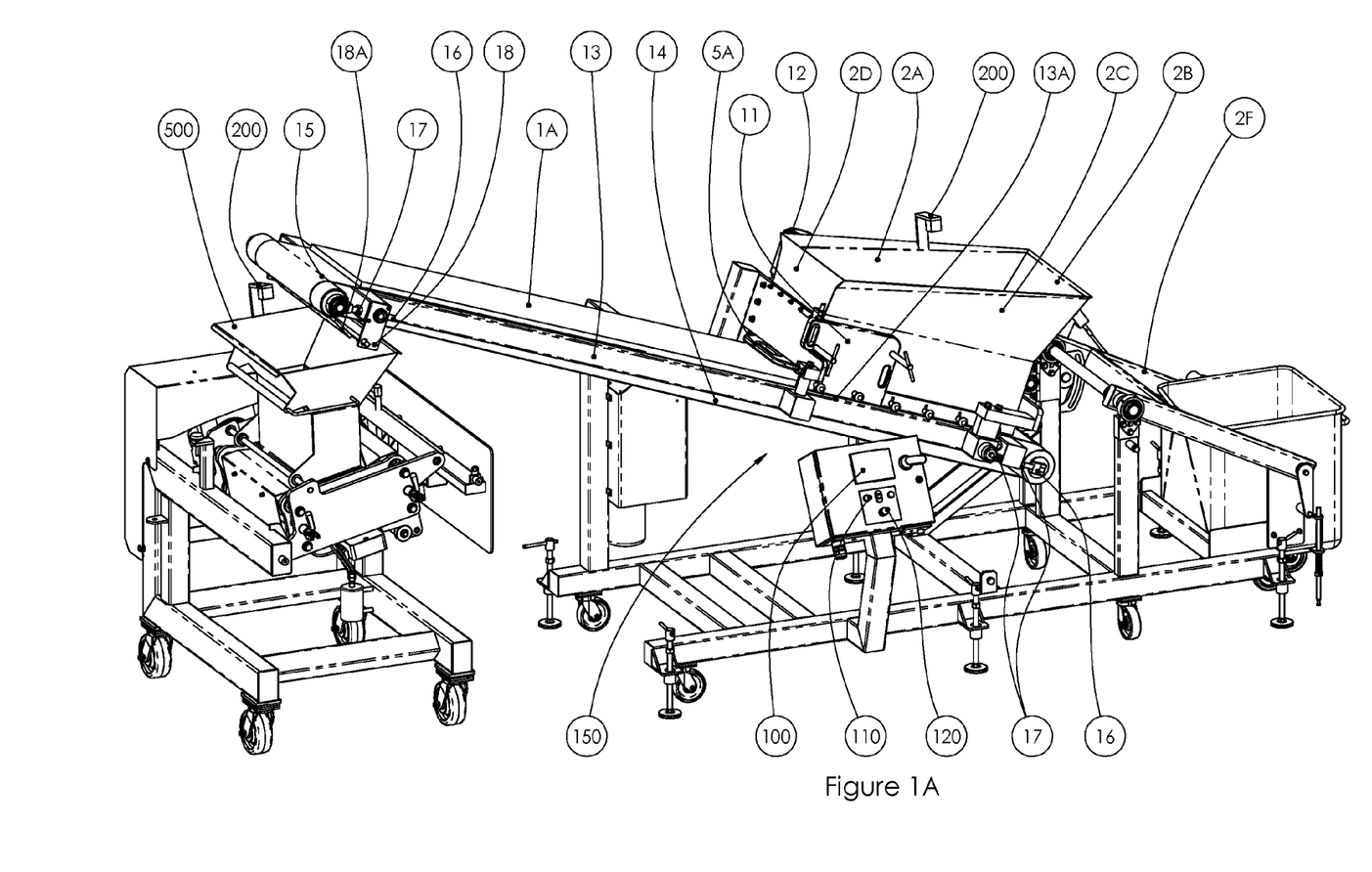
FIG. 1A shows an isometric view of an exemplary embodiment of the feeder producing a continuous slab.

FIG. 1A shows an isometric view of an exemplary embodiment of the feeder producing a continuous slab. The invention includes a feeder hopper 2 providing containment of the mixed dough or semi viscous material 1 poured or placed in the main feed hopper 2 which has four component side sections, a distal side 2A, back side 2B, proximal side 2C and discharge side 2D, relative to the views seen in FIGS. 1A thru 4 and the direction of discharge shown. The mixed dough or semi viscous material 1 is deposited into the area contained by these four side sections 2A, 2B, 2C, 2D of the feed hopper 2 where mixed dough or semi viscous material 1 is filled or deposited into. Typically this can be done by keeping the dough or semi viscous material in the mixer bowl or placing the dough in a tote and then engaging the bowl or tote in a lift, a non-limiting example of which is shown for illustrative purposes in FIG. 1A. Generally, a number of systems exist to move dough and can be made to feed the dough to the instant invention. The lift 2F, shown only for illustrative purposes in the figures, mechanically assists in lifting the tote or mixer bowl so as to put the dough or semi-viscous material 1 in the hopper 2, as shown in the exemplary embodiment of FIG. 1A.

In other embodiments, such as, but certainly not limited to when the instant invention is used with a larger horizontal shaft mixer, the point at which the feeder hopper 2 may be located adjacent to the mixer discharge point where the mixer bowl is elevated and can discharge directly into the hopper of the instant invention. The mixer bowl can be located elsewhere as well and transported to the instant invention. A further non-limiting example can be when the mixer is a typical horizontal shaft mixer, the lift 2F of FIG. 1A and subsequent figures would not be required as the mixed dough or semi viscous material would be discharged directly from the mixer into the feed hopper 2 of the instant of invention.

In the still further non-limiting examples, not specifically illustrated, where smaller mixers or mixers that employ a vertical mixing shaft are used to produce the mixed dough or semi viscous material there is often a need to provide for a certain amount of "laytime" or resting time, where the medium is left to sit so as to have certain ingredients or constituents become absorbed into the other ingredients/constituents. A bowl or tote is typically used to retain the mixed dough or semi-viscous material. A non-limiting example of a dough or material requiring such "laytime" is cookie dough that has up to fifty percent butter/margarine/fat/oil/water in a mix which may make the dough very soft and runny or fluid like initially. It is therefore difficult to portion and the portions have a difficulty in retaining a shape as they are of a nature that is so soft that the mixed dough or semi viscous material will flow, so the dough or semi viscous material is left to rest and setup so that some of the butter/margarine/fat/oil/water can absorb into the flour and or other dry ingredients and make the mixed dough or semi viscous material become stiffer or more viscous. In these cases the material is left in the mixer bowls or totes during this period of "laytime" prior to being fed to the exemplary embodiment of the instant invention.

After this required laytime is reached one way to infeed or get the dough into the hopper of the portioning machine is to have a person manually move the dough into the bowl and deposit the dough into the hopper of the portioning machine. Another alternative infeed method would be to remove the mixed dough or semi viscous material 1 from the bowl by lifting and then tipping the bowl so that the mixed dough or semi viscous material will come out of the bowl. An alternative to the lifting system shown for example would include but is certainly not limited to a hoist with the ability to turn or tip the bowl into the hopper. Such a hoist will pick up the mixer bowl and/or a tote so as to lift and discharge the mixed dough or semi viscous material into the hopper of the instant invention after the laytime is reached.

Again, the exemplary embodiment for the purposes of illustration depicts a lift. Alternatively, a lifting mechanism or any of the previous non-limiting examples of moving the dough to the hopper may be utilized. Further types of mixers may be utilized and the lift or manner of infeed varied without departing from the spirit of the invention, as in each case the dough will be received by an exemplary embodiment of the instant invention.

Figure 1B:
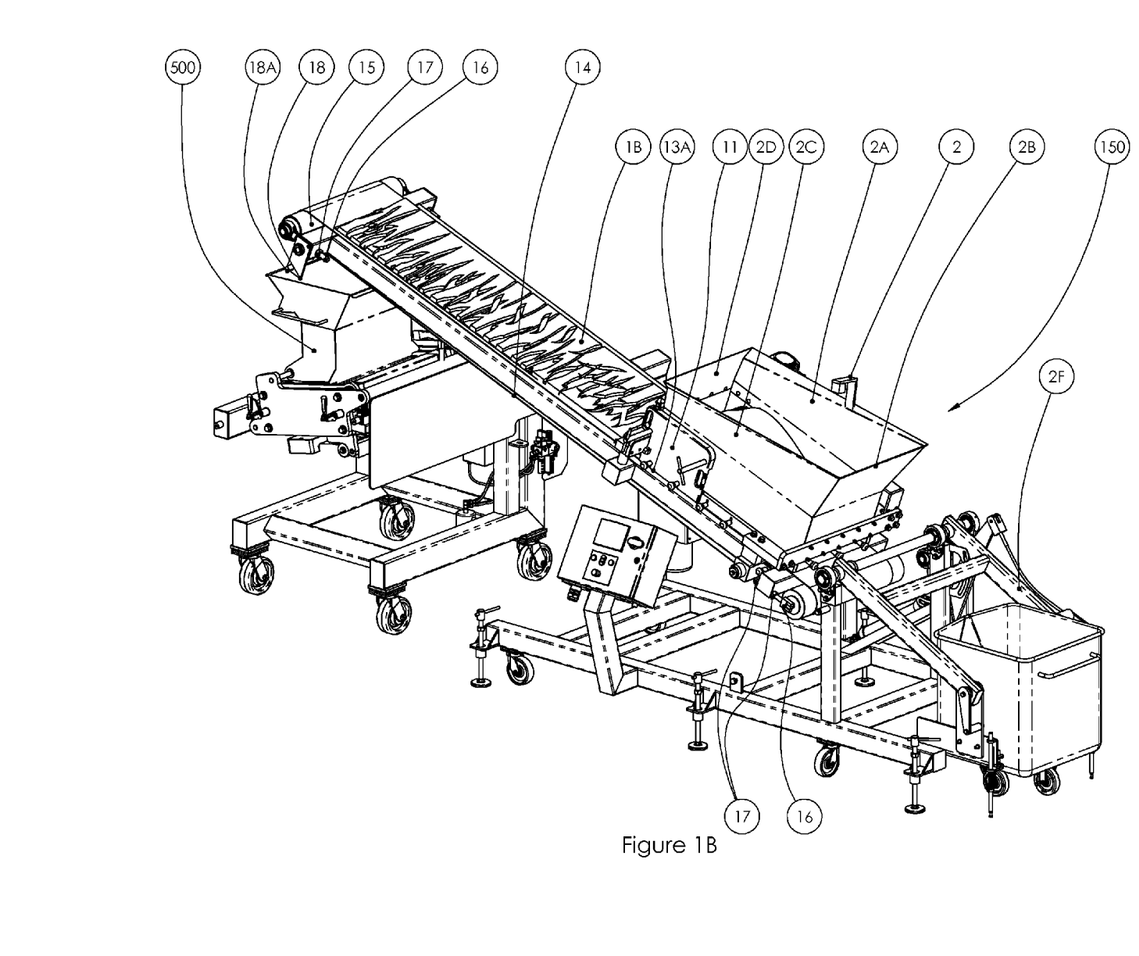
FIG. 1B shows an isometric view of the exemplary embodiment of FIG. 1A with the feeder producing a non-continuous flow.

FIG. 1A shows the feeder of the instant of invention producing a relatively consistent height and width slab. The hopper 2 and the portioning feed mechanism 150 are unique in that they allow for adjustment of the nature of the output on the conveyor 13. This allows the output to vary from a consistent slab 1A, as shown in FIG. 1A, to a non-continuous or broken "chunked" slab 1B, as shown in FIG. 1B, while maintaining a relatively consistent feed to the dough processing machine 500. This is achieved through variations in both gap spacing and one or more of the conveyor speed, the feed roller speed, and the conveyor and feed roller speed relative to one another. The dough or semi-viscous material 1 is lifted by lift 2F into hopper 2. A prime mover 12 is engaged with the at least one feed roller 5 to drive the dough 1 between the at least one feed roller 5 and conveyor belt 14. The dough or semi viscous material 1 is fed out through a gap spacing 5A as a slab 1A, 1B. The slab 1A, 1B travels along the conveyor 13 on the conveyor belt 14. The slab is discharged into the dough portioning machine 500 with its own hopper as shown which has a sensor 200. The sensor 200 senses a level of dough in the hopper of the further device or portioning machine 500. The embodiment includes tensioning devices 17 on tensioning brackets 16 for tensioning the conveyor belt 14. A feed conveyor scraper attachment plate 18 is located underneath the conveyor or conveyor bed 13. A conveyor scraper 18a is attached.

A consistent slab setting is provided in the exemplary embodiment shown in FIG. 1A through a combination of an at least one feed roller 5, here shown as a single roller, and powered feed conveyor belt 14 and the respective operating speeds and a gap 5a spacing which provides a relatively uniform thickness slab as shown. Reference is made throughout the specification to singular and plural elements. Unless specifically stated, the singular includes the plural and the plural includes the singular in all cases. Furthermore, reference to "a", "an" or "one" includes multiples of the same. The distance between the powered feed or metering roller 5 and the speed of powered feed conveyor belt 14 is the gap 5a spacing in the exemplary embodiment shown and it can be, but is not limited, to a gap spacing of between about ¼ inch to about 6 inches, but is preferably about a gap of ¼ to 2 inches. In further embodiments this spacing may be adjusted to suit the nature of the dough or semi-viscous material as further explained herein.

A first variable in determining the condition of the output flow or slab 1A, 1B from the instant invention is gap spacing. A gap 5A exists at the output of the hopper 2 and the conveyor belt 14. The gap 5A can be adjusted primarily based on the nature and consistency of the material being moved. For instance, in a non-limiting example, with softer mediums it is typical to set the spacing so that the gap 5A is smaller so as to reduce the height of the slab so that it resists spreading or flowing in the width of the slab or having the dough or semi viscous material 1 slide or flow back towards the feed roller 5 as the slab rests atop the powered feed conveyor belt 14. Keeping the slab thinner also provides for decreasing the reverse movement or flow back of the mixed dough or semi viscous material 1 towards its starting point during pauses in operation. Conversely if a stiff dough or stiffer semi viscous medium 1 is being processed the gap 5a can be increased as the ability or likelyhood of the material flowing back is reduced due to the stiffness of the dough or semi viscous medium 1. Again, the operating gap space 5A is typically set as based on the characteristics of the medium and required feed to the subsequent portioning machine but is also a factor in the condition of the output slab 1A or 1B of the machine. The gap space 5A would also be adjusted to function in conjunction with the relative speed settings as further variables in adjusting the output to the portioning machine.

A further variable affecting the output is the speed of the conveyor belt 14. The conveyor belt 14 can have, but is certainly not limited to, a surface feed speed rate of between about 10 and 200 feet per minute, but more specifically between about 10 to 50 feet per minute in an exemplary embodiment to produce a slow feed rate to the portioning device 500. Additionally, medium feed rate, in an exemplary embodiment, can be, but again is certainly not limited to, more specifically between 50 and 90 feet per minute. Again, a further high setting in an exemplary embodiment can be more specifically, but is certainly not limited to, between about 90 to 140 feet per minute. The output can be determined by the conveyor belt 14 speed relative to the gap spacing 5A and the relative speed of the feed roller 5.

A still further variable in the formation of the output is the surface speed of the feed roller 5. The feed roller 5 can be set to, but is certainly not limited to, a surface feed speed rate of between about 10 and 200 feet per minute, but more specifically between about 10 to 50 feet per minute in an exemplary embodiment to produce a slow feed to the portioning device 500. Additionally, a medium feed rate, in an exemplary embodiment, can be more specifically, but again is certainly not limited to, between about 50 and 90 feet per minute. Again, a further high setting in an exemplary embodiment can more specifically be, but is certainly not limited to, between about 90 and 130 feet per minute.

The output is principally based on a range of feed rates, forming a difference in the relative rate of output between the moving surface of the conveyor 14 and the feed roller 5, defined as a delta or variable representing the difference in speeds between the moving surface of the conveyor and the moving surfaces of the at least one feed roller 5. In producing a consistent slab, the delta or difference between the conveyor belt 14 surface speed and the feed roller 5 surface speed should be at about zero to about three, but this will be very dependent on the consistency of the material in the system. This means that the relative surface speeds of the roller and the conveyor will not put added shear forces on the material, resulting in a relatively consistent slab.

To facilitate the selection of these settings from a wide variety of inputs, a man machine interface (MMI) 100 is provided to adjust these inputs. The MMI 100 may be configured to provide single input controls for each variable or may be provided with a single delta input adjustment. A series of user inputs 110, 120 or a touch sensitive user interface on the MMI are provided on the MMI to set the variables discussed herein and to program and operate the device. The MIMI 100 can include a memory storage device to save settings for these variables within memory to repeat a production run or to speed operations. In this fashion, the output slab 1A or 1B of the instant invention can be varied and "broken" or "chunked" up as shown in FIG. 1B. Additionally, another sensor 200 can be provided to sense the level of dough in the hopper 2, so that when a low condition is determined, an alert or reminder may be transmitted to supply more dough to the device.

FIG. 1B shows an isometric view of the exemplary embodiment of FIG. 1A with the feeder producing a non-continuous flow. The exemplary embodiment shown has similar features and components to those shown and described in relation to FIG. 1A. In an exemplary embodiment allowing for variation of one or more of the at least three variables, namely feed roller to conveyor gap 5a spacing, powered feed conveyor belt 14 speed and feed roller 5 speed, the instant invention can produce a further operational mode of a non-continuous flow or output slab 1B. In a non-limiting example of the variable settings for instance the gap would be set for about 3 inches, more specifically between about 1 to 1½ inches. If a slow feed is desired a setting of about 20 feet per minute can be set for the feed roller 5 and 80 feet per minute for the powered feed conveyor belt 14.

Additionally, in the non-limiting example, for a medium speed in the same embodiment, a feed roller speed 5 of about 35 feet per minute can be set and a powered feed conveyor belt 14 speed of 110 feet per minute and, or a delta of 60 may be set. For high speed, again the non-limiting example can be operated with a feed roller speed of about 50 feet per minute, and a powered feed conveyor belt 14 speed of about 160 feet per minute and or a delta of 110. In either case, in the operation of the instant invention a non-uniform or broken slab 1B or output can be formed. The broken or chunked or non-uniform feed or slab 1B is varied and the breaks/chunks/non-uniformity increase with greater surface speed disparities. Smaller broken pieces or chunks occur with greater gaps between them are also partly developed based on the material of the slab.

Though reference is made to varying the speeds of both the feed conveyor belt 14 and the at least one feed roller 5, relative speeds of the surfaces may also be provided with one of the surface speeds having a fixed input, where the variation in output is based on the gap spacing 5A, the fixed speed of the conveyor belt 14 and the variable speed of the surface of the feed roller 5, for instance. Similarly, the feed roller 5 speed may be fixed and the conveyor belt 14 speed varied to produce a variation in the output, all without departing from the spirit of the invention. In this manner, the feed supply of the conveyor 13 and hopper 2 of the instance invention can vary the output in a unique manner.

Figure 2:
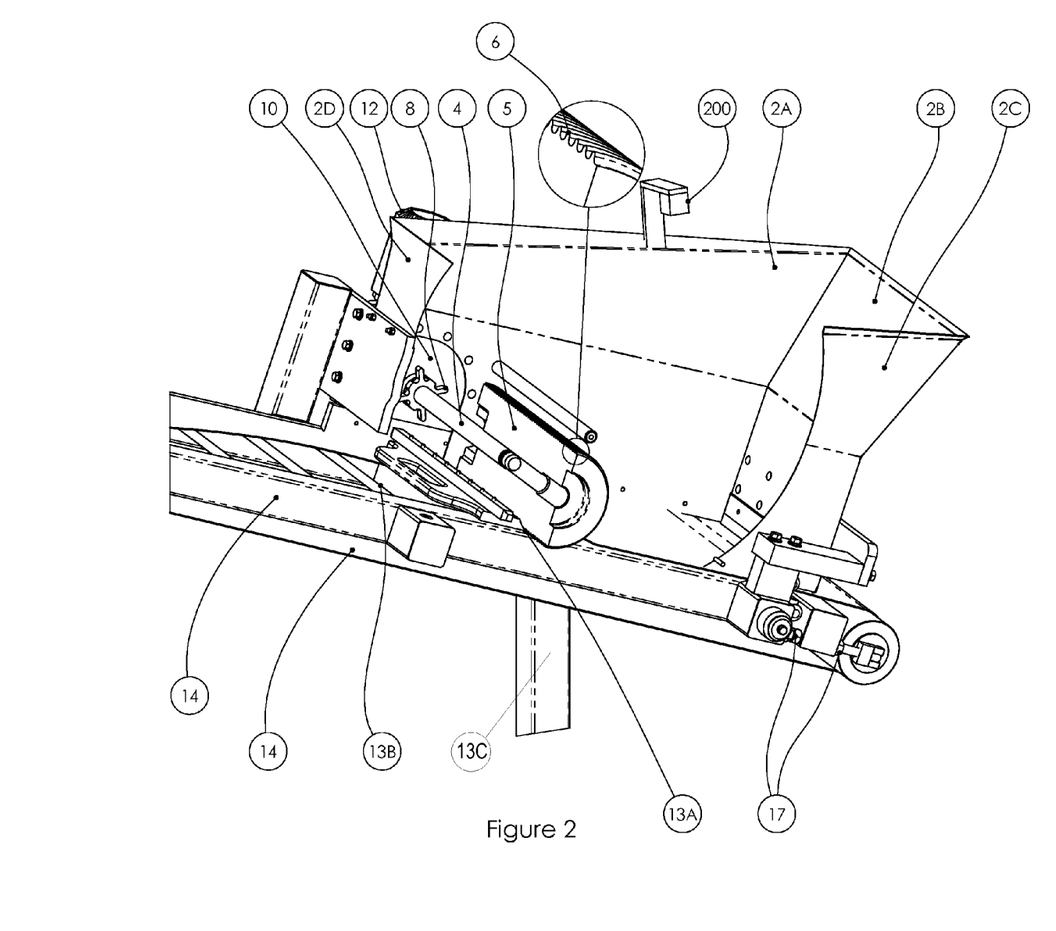
FIG. 2 shows a side cutaway view of the feeder of an exemplary embodiment with a removable end plate removed.

FIG. 2 shows a side cutaway view of the feeder of an exemplary embodiment with a removable end plate removed. As seen in FIG. 2, Feed roller 5 sits upon the feed roller shaft 4, the feed roller 5 is driven in rotation by the torsional drive forces provided by the prime mover 12 which transmits thru the feed roller drive shaft 4. The rotational force is transmitted thru feed roller drive dog 8 which is fixed in position and rotationally coupled to feed roller shaft 4. Feed roller 5 contains a corresponding female bore shape to that of feed roller drive dog 8 and engages the feed roller drive dog 8 in the exemplary embodiment shown, but can be varied so long as the motion is transmitted to the invention. To engage feed roller 5 to feed roller shaft 4 one first centers the feed roller 5 to the feed roller shaft 4 till the bore of the feed roller 5 slides onto the feed roller shaft 4 then move feed roller 5 slidably along the feed roller shaft 4 till the female feed roller drive engagement profile 9 slides over and along the outer profile of the feed roller drive dog 8 where upon the rotational drive forces that are instilled in feed roller shaft 4 by a typical prime mover 12, such as but not limited to an electric motor or electric gear motor or electric drive coupled to a gear reduction to feed roller drive motor 12.

The distal feed roller stationary drive plate 10 is part of the hopper 2 or is mechanically fastened to the hopper section 2D and completes the enclosure of the mixed dough or semi viscous material 1. The feed roller stationary plate 10 also provides a location upon which the feed roller prime mover or drive motor 12 can be affixed as well as the bearings that support the feed roller shaft 4. The feed roller stationary drive plate 10 also provides a surface that is perpendicular to the axis of the feed roller shaft 4, this surface is parallel to the face of the feed roller 5 and allows for a seal surface so that mixed dough or semi viscous material 1 cannot get around the distal end of the feed roller 5 and/or between the area bounded by the feed roller 5 and to feed roller stationary drive plate 10 so as to penetrate into the area of the feed roller drive dog 8 and the feed roller engagement profile 9. A distal feed hopper side seal (not shown) is coupled to distal side 2A of the hopper 2. On the opposing side of the instant of invention there is a feed roller removable plate 11 that locates the feed roller shaft 4 at the non-driven end of the feed roller shaft 4. The feed roller removable plate 11 also functions so as to contain the mixed dough or semi viscous material 1 while feed roller removable plate 11 also has a seal surface 3A that keeps the mixed dough or semi viscous material 1 from squeezing out from below the feed roller end plate 11 and the powered feed conveyor belt 14.

In further embodiments the invention could also be made or produced with additional feed rollers which can be unitized so as to act in a progressive manner so as to bring the height of feed dough or semi viscous material 1 to a decreased height or level so as to feed the dough or semi viscous material 1 in a more progressive manner. These additional embodiments are within the scope the invention. Again, this would be specific to the type of medium, but the invention does contemplate multiple feed rollers, whereby the nature of the dough or medium being processed can be affected or where a further reduction greater than a single pass can provide is desired.

The feed roller 5 or rollers can also be fitted with or without profiles 6 that are suited or best suited for dough or semi viscous material 1 to be fed to subsequent processing or portioning machines. Some non-limiting examples of instances utilizing flat or low profiled rollers can be, but are certainly not limited to, stiffer low fat dough or semi viscous materials such as but not limited to cracker or pizza dough which may be able to run with a flat faced feed roller against the dough or semi viscous material 1 and have adequate grip/traction so as to deform the pizza or cracker dough so as to fit between the feed roller 5 face and the supported powered lower feed conveyor belt 14. The mixed dough or semi viscous material 1 can then be formed to the desired slab of dough to feed up the conveyor 13.

In the case of dough or semi viscous materials 1 that may be softer or have a high fat/oils contents it can be desirable or optimal to utilize a feed roller profiles 6 on the outer face as shown that would allow the dough to go into the profiles of the feed roller 6 so as to be able to allow for a higher degree of adhesion of the dough or semi viscous material 1. Some of the non-limiting examples of profiles that can be used include a serpentine profile or an intermeshing profile that increases the grip of such soft and hi fat dough or semi viscous materials 1. In either case, the at least one feed roller 5 is shown and is releasably mounted thereon to facilitate cleaning and repair/replacement of the instant invention as best seen in relation to FIG. 3.

As seen in FIG. 2, in the cross-section shown of the feeder hopper 2 with removable end plate 11 removed and feed roller 5 fitted and supported on feed roller shaft 4. The removable end plate 11 is shown removed, the removal of such aids in the cleaning of surfaces and the powered feed or metering roller 5 is shown slightly pulled out of engagement from the feed roller drive dog 8 so as to expose back side of powered feed roller 5 and back feed roller stationary end plate 10. This shows the non-operating position and features provided for easier cleaning and maintenance of the instant invention.

When in a non-operational state, the device allows for further disassembly and access for cleaning. On embodiments that may have one or more feed roller(s) 5 that contains feed roller profile(s) 6 in these cases the feed roller 5 and feed roller scraper 7 are moved slidably away from the feed roller stationary end plate 10. Once the feed roller 5 and feed roller scraper 7 have moved along the feed roller shaft 4 for a short distance, the feed roller scraper 7 will have come out of its attachment slot in feed roller stationary plate 10 and can be removed from the invention. At this point the feed roller 5 is slidably moved far enough away from the feed roller stationary end plate 10 that complete access for cleaning is attained. The feed roller 5 is also able to spin about the axis of the feed roller shaft 4 so as to allow for cleaning all surfaces of the feed roller 5 as well as any or all feed roller profiles 6 without the need to remove the feed roller completely for cleaning. The feed roller 5 may also be fully removed by sliding the feed roller along the axis of the feed roller shaft 4 until it is completely disengaged from the feed roller shaft 4. This allows for a variation in the feed roller profile(s) 6 to suit a variety of dough or semi-viscous materials/mediums 1 being moved. Assembly can be carried out by reversing the procedure.

Figure 3:
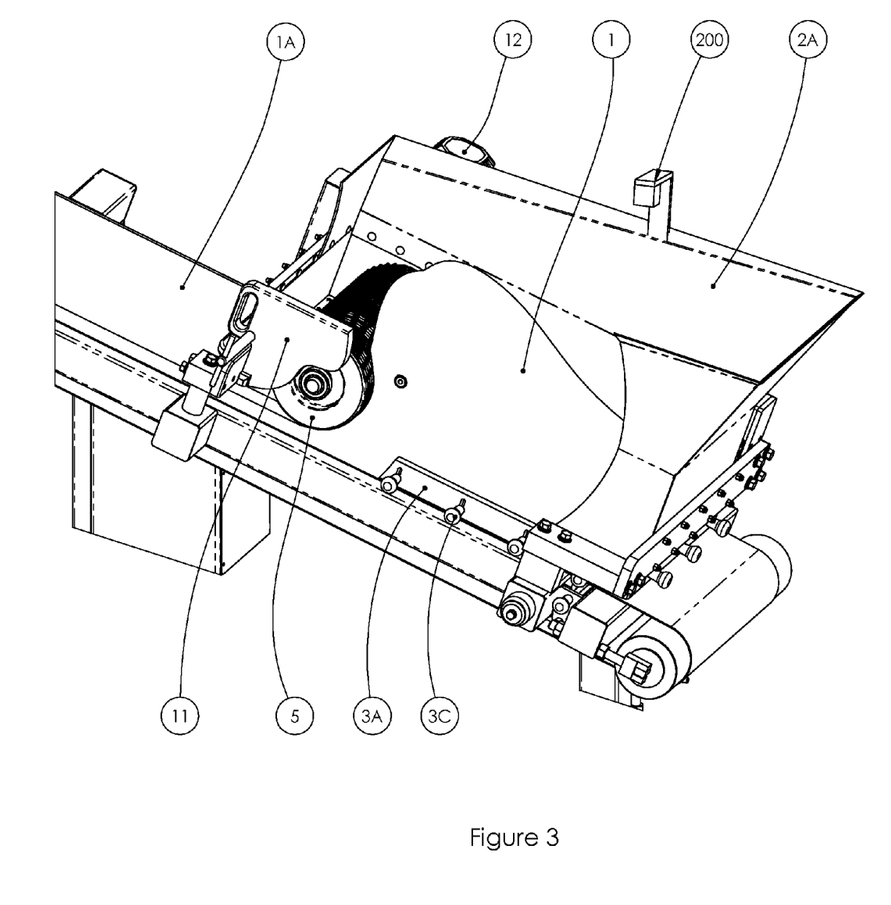
FIG. 3 shows a cutaway isometric view of the feeder of an exemplary embodiment producing a continuous slab.

FIG. 3 shows a cutaway isometric view of the feeder of an exemplary embodiment producing a continuous slab. To form the slab 1A of mixed dough or semi viscous material 1 for output, the mixed dough or semi viscous material 1 must be partially formed by the feed roller 5 and the possible use of feed roller profiles 6 which are contained in the outer perimeter of feed roller 5. Although optional, the purpose of the feed roller profiles 6 is to add traction to the entrainment of the mixed dough or semi viscous material 1 and to remove the uniform slab of mixed dough or semi viscous material 1 at a point at the feed roller to conveyor gap or gap spacing 5A between the feed roller 5 and conveyor 14 when viewed in FIGS. 1A-4. There is included at or near this point a feed roller scraper 7 with a profile that compliments or commutes within the outer profile of the feed roller profile 6.

As seen in FIG. 3, the inclination of the feed conveyor structure 13 further aids in this recirculation in the hopper 2 shown by allowing for the flow or rolling back of excess dough or semi viscous material 1 that was not able to pass thru the gap between the powered feed roller 5 and the powered lower feed conveyor belt 14. The excess mixed dough or semi viscous material 1 will be motivated in part by a vector due to the inclination to flow or be moved around so as to re-approach the entrainment area of the powered feed roller 5 and powered lower feed conveyor belt 14. This re-feed of mixed dough or semi viscous material 1 flow direction will be opposed or restricted by the additional mixed dough or semi viscous material 1 flowing towards the powered feed/metering roller 5 due to the travel of the powered feed conveyor belt 14.

Figure 4:
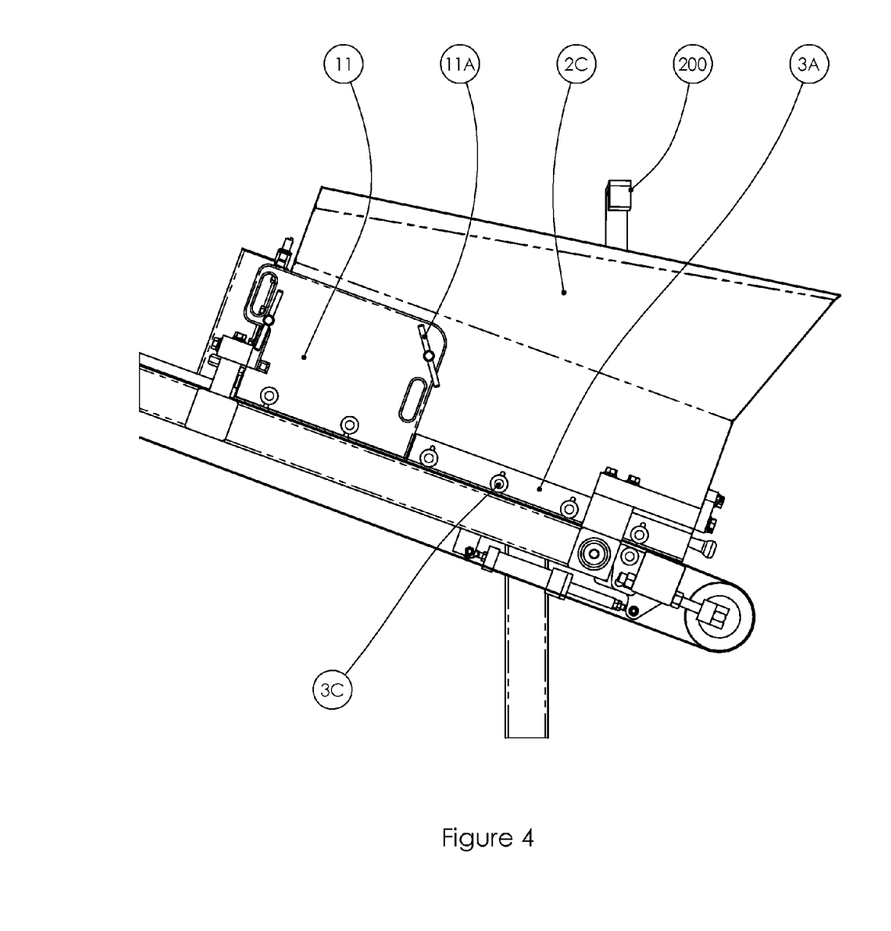
FIG. 4 shows a side view of an exemplary embodiment of the feeder with removable end plate in place.

FIG. 4 shows a side view of an exemplary embodiment of the feeder with removable end plate in place. The proximal side 2C is shown in communication with the removable end plate 11. The removable end plate 11 can be removed for access to the feed roller 5 during cleaning as further specified herein below. The removable roller plate release handles 11A are used to detach the removable end plate during these operations. A feed hopper proximal side seal 3A is shown preventing the escape of semi-viscous material 1 from the side of the hopper 2 working in conjunction with feed hopper side seal retaining fasteners 3C.

Figure 5:
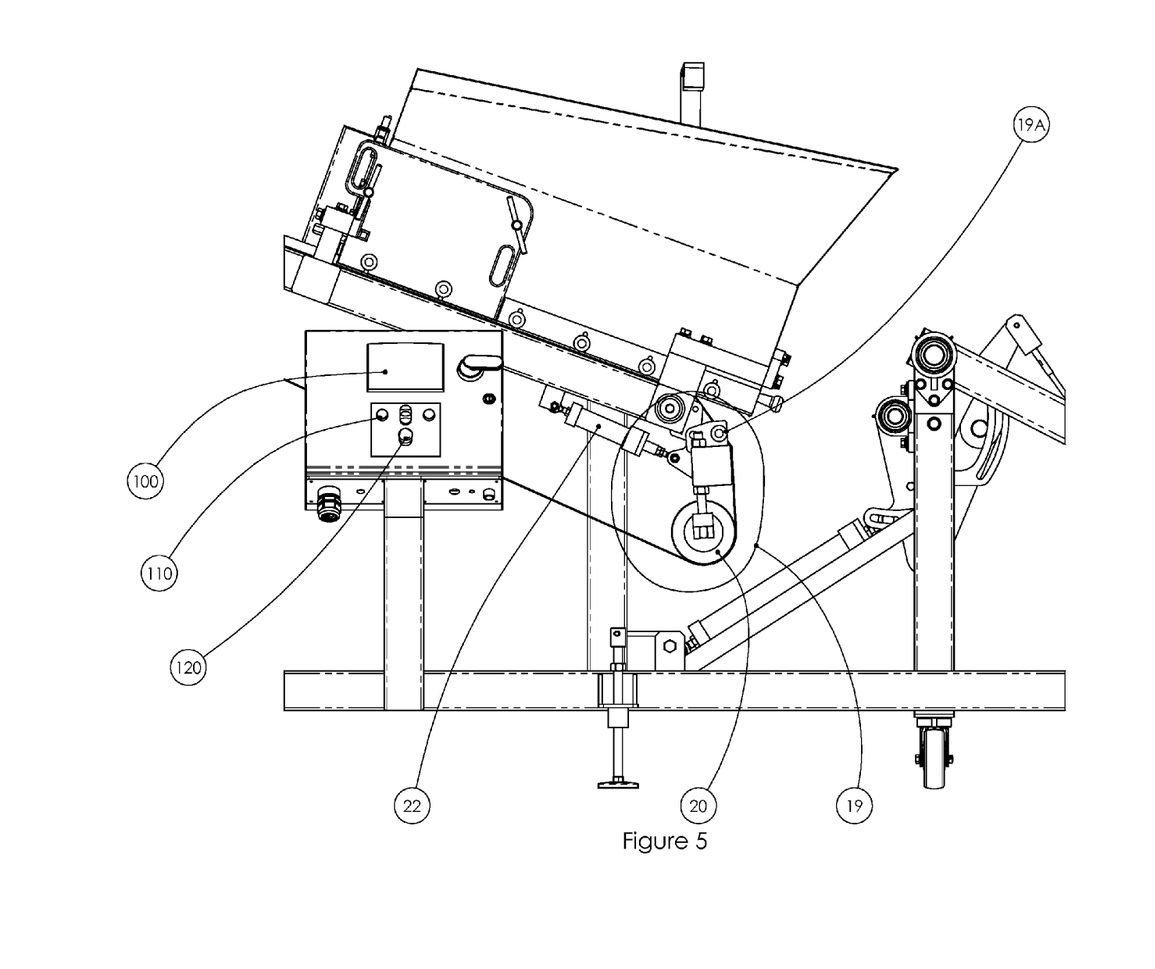
FIG. 5 shows a side elevation of the instant of invention.

FIG. 5 shows a side elevation of the instant of invention. As seen in FIG. 1A, FIG. 1B, and FIG. 5 the feed conveyor 13 has structure or support members 13C that are structured so that the feed conveyor 13 can be set to be to angles of but certainly not limited to between about the horizontal to about 80 degrees from horizontal as viewed when the mixed dough or semi viscous material 1 goes from the powered feed roller 5 to the feed conveyor discharge pulley 15 and feed conveyor scraper 18a where the dough or semi viscous material 1 will discharge from the powered feed conveyor belt 14. In an exemplary embodiment of the invention, the feed conveyor is, in this non-limiting example, at or about an angle of inclination of around 20 to 30 degrees inclination when viewed going from the powered feed roller 5 to the discharge point or end of feed conveyor belt 14. This angle of inclination providing a dual function in that it takes the mixed dough or semi viscous material 1 and moves it from a lower level and delivers it to a higher level where it may discharge to the hopper of the portioning machine or any other desired device or machine 50. Additionally, the angle of the feed conveyor belt 14 in a second function displaces excess dough and forces it to roll back in such a manner as to force the feed roller to feed it again into the dough slab 1A output.

The powered and moving feed conveyor belt 14 is supported by the frame of the feed conveyor structure 13, feed conveyor bed 13A and feed conveyor cross members 13B that are placed between the outer conveyor frame members and spaced so as to be far enough apart so as to allow for cleaning access between conveyor frame cross members 13B which are mounted to be perpendicular to the travel of the powered feed conveyor belt 14 and close together enough so as to properly support the powered feed conveyor belt 14 provided that the powered feed conveyor belt 14 is sufficiently tensioned so as to be taut enough to support the mixed dough or semi-viscous material 1. In a non limiting example, a typical pitch spacing of the feed conveyor cross members 13B is twenty inches, but can be varied and can include for instance from five inches to forty inches or lesser or greater spacing to suit the needs of the conveyor.

Additional elements of the exemplary embodiment are shown in FIG. 5 for the further operation of the invention. The feed conveyor discharge scraper 18a is mounted at the discharge end of the feed conveyor 13 and below the feed conveyor discharge pulley 15. The discharge scraper 18a is meant to remove any residual mixed dough or semi viscous material 1 that did not fall from the powered feed conveyor belt 14 surface as the powered feed conveyor belt 14 passed around the arc of the radius of the feed conveyor discharge pulley 15.

Figure 6:
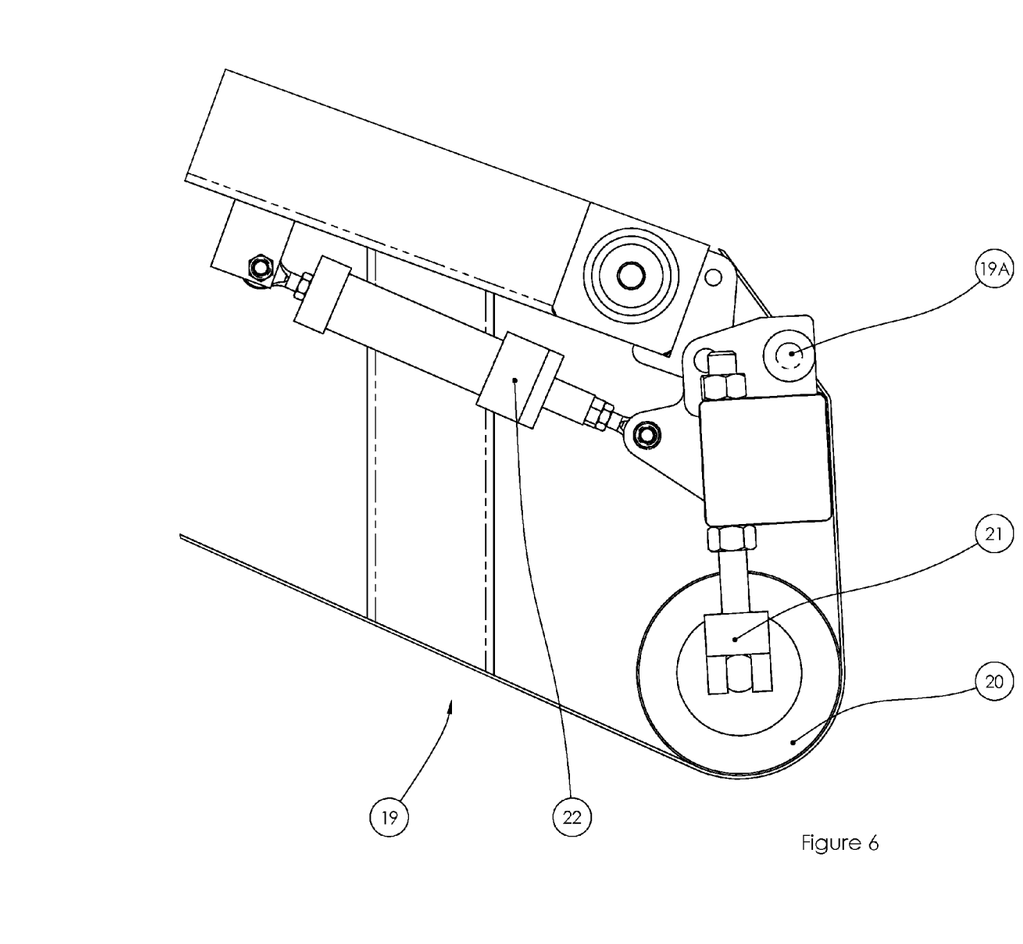
FIG. 6 shows an exploded view of the flip section of the feed conveyor in the open position to allow for feed conveyor belt removal.

FIG. 6 shows an exploded view of the flip section of the feed conveyor in the open position to allow for feed conveyor belt removal. The use of the feed conveyor flip nose 19 is to allow for easy and quick removal of the powered feed conveyor belt 14 so as to be able to sanitize the powered feed conveyor belt 14 as well as gain cleaning access to the feed conveyor 13 frame, cross frame members 13B as well as the feed conveyor bed 13A that is under the powered feed conveyor belt 14 where the feed conveyor 13 is under the feed hopper 2 and under the powered feed roller 5 which is where it needs to have greater support of the mixed dough or semi viscous material 1 as it is being squeezed so as to pass thru the feed roller to conveyor gap 5A of the powered feed roller 5 and the powered feed conveyor belt 14. The feed conveyor cross members 13B function so as to support the powered feed conveyor belt 14 so that the belt cannot slip between the feed conveyor cross members 13B transverse rods when subjected to the inrush and surge loading of the mixed dough or semi viscous material 1.

On the lower end of the feed conveyor and partially under the feed hopper 2 there is a feed conveyor flip nose 19. When feed conveyor flip nose 19 is in the up position brings about tension on the powered feed conveyor belt 14 and where the pivot point of the flip section is placed so as provide a degree of self-locking to keep it in the closed position without the need of force from the feed conveyor flip nose pulley mount actuator 22. An additional feed conveyor flip nose retaining pin 19A is provided so as to lock the feed conveyor flip nose 19 in the upright position. The embodiments and examples discussed herein are non-limiting examples.

An exemplary method of operating the instant invention shown in FIG. 1A begins with the mixed dough or semi viscous material 1 has been placed in the hopper 2 of the invention the mixed dough or semi viscous material 1 will sit upon the flat or inclined powered feed conveyor belt 14 which in turn is supported by the feed conveyor 13. The hopper 2 contains the mixed dough or semi viscous material 1 where the hopper 2 encloses the mixed dough or semi viscous material on three sides fully and with one side partially, whereby the gap 5A allows output on this side, contained by the hopper 2 in the exemplary embodiment shown, where the partially enclosing hopper discharge 2d side sits atop a powered feed roller 5 which is atop a powered lower feed conveyor belt 14. The powered lower feed conveyor belt 14 moves the mixed dough or semi viscous material 1 forward to a rotating feed roller 5 that comes in contact with this advancing mixed dough or semi viscous material 1.

Upon contact of the mixed dough or semi viscous material 1 with the powered feed roller 5 the mixed dough or semi viscous material will become entrained to the feed roller 5 and the optional feed roller profiles 6 as well as to the powered lower conveyor belt 14. This combined entrainment provides for a decreased area to where the mixed dough or semi viscous material will be squeezed into and the confined mixed dough or semi viscous material 1 is squeezed down to the desired thickness to effectively form a continuous ribbon or slab of mixed dough or semi viscous material slab 1A or non-continuous slab 1B. This squeezed down slab 1A or slab 1B of mixed dough or semi viscous material 1 will exit and go out on the powered feed conveyor belt 14 to the portioning device 500. This can be seen in FIG. 1A for a continuous flow or slab and 1B for a non-continuous flow or slab. Once a continuous slab 1A of dough or semi viscous material 1 or a stream of broken slab 1B of mixed dough or semi viscous material 1 comes out from the gap 5A the mixed dough or semi viscous material 1 will stay on the surface of the moving powered feed conveyor belt 14. The moving powered feed conveyor belt 14 being supported by the frame of the feed conveyor structure 13.

Flow patterns of the mixed dough or semi viscous material 1 can also be modified to suit the preferred delivery pattern as an example certain materials such as but not limited to cookie dough are typically preferred to be delivered in a broken slab or non-uniform or "chunked" 1b pattern of flattened clumps of dough or semi viscous material 1 that as they fall into the hopper of the cookie portioning machine 500 they can and will fall in pieces and produce a more uniform distribution of dough or semi viscous materials 1 in the hopper of the portioning machine 500 as compared to if the dough was delivered in a constant slab 1A of dough or semi viscous material 1.

A non-limiting example of a situation in which a chunked or non-continuous flow 1B may be preferable to continuous slab like 1A occurs when the feeding dough or semi viscous material 1 needs to be more consistent. A continuous slab like 1A may enter and stand up in the hopper of the portioning machine 500 so as to cause a hollow feed of dough to the portioning machine 500. In this case the at least one sensor, here a level sensor 200, will stop and start the invention so as to maintain a reasonable stable level of dough in the hopper of the portioning machine 500 based on the height of the dough in the hopper of the portioning machine 500. The at least one sensor senses a low volume in the portioning machine 500 hopper and starts the dough feeding device of the instant invention. A further signal for full in the portioning machine 500 hopper is received from the sensor 200 and this stops the dough feeding device. The sensor 200 can also, as shown in FIGS. 1A-5, be on the portioning machine 500 being supplied by the dough feeder device. Alternatively, the sensor 200 can be mounted on the conveyor frame 13,13A, 13B, 13C, or similar mounting point on the instant invention. In either case, the sensor 200 in this instance is sensing the level of dough in the portioning machine 500 and starting and stopping the dough feeder of the instant invention. As described herein below, a similar sensor 200 may also be mounted to sense conditions in the hopper 2 of the instant invention as well to monitor the level of dough 1 in the dough feeder. This sensor may initiate an alert for more dough for the dough feeder or similar monitoring of the operations of the instant invention.

In the instance where a "hollow" falling continuous slab has stood up in the hopper of the portioning machine 500 the sensor 200 will register the dough level as being the height of the standing up slab 1A and therefore allow the level of dough as fed to go down before restarting the invention so as to feed more dough or semi viscous material 1 in the hopper. This hopper level registration based on reading the top of the standing up continuous slab of dough or semi viscous material 1A will create an actual lower volume of dough or semi viscous material 1 in the hopper than is the registered amount resulting in a lower head pressure of dough or semi viscous material 1 due to the weight pressing down in the hopper. Depending on the height of the continuous slab 1A if the disparity of actual dough and the height registered is great enough the portioning machine could actually starve for dough where the portions would become underweighted. The non-continuous slab 1B as shown may overcome this issue and provide more accurate readings of the amount of dough in the hopper of the portioning machine 500 in some instances and thereby better maintain desired head pressure and portions of uniform weight or volume.

To provide a broken slab 1B to the hopper of the portioning machine will tend to crumble feed or feed the hopper of the portioning machine a supply of broken pieces of dough or semi viscous material 1 that can fall and roll into void areas so as to better or more completely fill the portioning machine 500 hopper the powered lower conveyor belt 14 surface speed setting will be set so as to exceed the feed roller 5 surface speed setting. This can be done by setting the speeds of the feed roller 5, the powered feed conveyor belt 14 and the gap spacing setting by a user on the MMI 100 through the user inputs 110, 120. A series of user inputs 110, 120 or a touch sensitive user interface on the MIMI are provided on the MMI to set the variables discussed herein and to program and operate the device.

The individual speeds may be adjusted or a delta of the speeds may be adjusted. For example, these settings may include, but are certainly not limited to, speeding up the conveyor surface speed 14 to travel faster than the powered feed roller 5 surface speed at which point the powered feed roller 5 will not be able to move the dough into the gap 5A area at a sufficiently high rate and effectively act as a constraining device so that the powered feed conveyor belt 14 will pull too fast to provide for full coverage of dough or semi viscous material 1 to the powered conveyor feed 14 belt and the appearance of a broken slab 1B with voids in it will occur. This broken effect or chunks of dough or semi viscous material 1 will provide for the crumble filling of the portioning machine 500 hopper. The magnitude of the broken section and or the amount of voids in the slab will be significantly influenced on how much faster the powered lower conveyor belt 14 goes in relationship to the powered upper feed roller 5, the delta as discussed herein. Similarly, if the conveyor belt 14 and powered feed roller 5 speeds are similar with low or no difference or delta, the slab 1A will be uniform.

FIG. 3 provides a good view of the stacking of dough or semi-viscous material 1 in the hopper 2 during operation. This view shows the method of the presentation and entrainment of the semi-viscous medium or dough 1 in the feed roller 5. In this exemplary embodiment, an optional feed roller profile 6 is shown on the feed roller 5. The dough or semi viscous material 1 being squeezed to the feed roller profiles 6 of the feed roller 5 as well as to the surface of the powered feed conveyor belt 14, the dough or semi viscous material 1 being squeezed with the resulting excess dough or semi-viscous medium 1 that does not pass thru the feed roller to conveyor gap 5A flowing back towards where it came from as well as the powered feed conveyor belt 14 which is advancing additional dough or semi viscous medium 1 towards the feed roller 5. FIGS. 1A and 2-4 show a uniform slab 1A and FIG. 1B shows a non-uniform slab 1B being composed of a semi-viscous material or medium 1 being entrained by and pushed through conveyor gap 5A by the feed roller 5 and conveyor belt 14. Each method of operation provides a flow of material to the portioning machine 500. The flow passes between the feed roller 5 and the feed conveyor belt 14 where the feed roller scraper 7 removes the adhering excess dough or semi-viscous medium 1 from the surface of the feed roller 5 as well as from the profile 6 of the feed roller 5 and persuades the dough or semi viscous medium 1 to continue up the powered feed conveyor belt 14.

For the feeding of stiff or a more viscous mixed dough or semi viscous material 1 it is typically advantageous to increase gap spacing 5A of the feed roller to conveyor. The more stiff and brittle the materials the better it can retain shape and not flow, therefore it is desirable to make the flow of material into a taller or thicker slab as it requires less power to form a thick slab as compared to when one forms a thinner slab. Making it taller and not squeezing it so hard also reduces the probability or amount of brittle cracking under load. Generally, it is desirable to hold the gap as large as possible so as to keep the operating stresses due to the required squeezing of the dough or semi viscous material 1 to a minimum and power consumption to a minimum. When creating a continuous thick slab 1A or thick broken slab 1B, the power required is also minimized as compared to try to producing a continuous thin slab 1A or thin broken slab 1B at the same surface speed.

In contrast when the dough or semi viscous materials 1 are used that are higher in fat and liquid ingredients, such as but not limited to a cookie dough where when the higher fat and liquid material cookie dough is placed on an inclined conveyor it would have a lower tendency to retain a shape and higher probability of flow than in the case of similar materials, it would be advantageous to decrease the gap distance so that the continuous slab 1A or non-continuous slab 1B decreases in height and the resulting slab is less likely to lose its profile and less likely to slide or flow down the incline of the conveyor belt 14.

Of course, a thinner or thicker slab will also affect the delivery rate of the mixed dough or semi viscous material delivery to the portioning machine 500, which will further potentially require adjusting the operating speeds of the feed roller 5 and conveyor 14. When the instant invention is activated so as to feed or issue out the mixed dough or semi viscous material 1 the feed roller 5 will start to rotate in a rotational direction so as to entrain and feed the mixed dough or semi viscous material 1 toward the gap 5A between the powered feed roller 5 and the powered lower conveyor belt 14 where the direction of movement of the powered lower conveyor feed belt 14 is the same as the direction or rotation of the feed roller 5 as noted above, the movement speeds of these elements may be adjusted to result in different slabs 1A,1B but the portioning machine or other production machine 500 being fed will require a delivery rate and this will also factor into the operating speeds selected. This delivery rate may be varied based on the type and nature of the materials being supplied as discussed above.

As the powered feed roller 5 rotates the powered lower conveyor belt 14 will be set in motion so as to feed or present the mixed dough or semi viscous material 1 to the powered feed roller 5 as well as provide and maintain positive pressure of the mixed dough or semi viscous material 1 to the powered feed roller 5, so that the mixed dough or semi viscous material 1 will enter and or be pressed against the powered feed roller 5. The combined movement of powered feed conveyor belt 14 coupled to the rotational movement of the powered feed roller 5 producing the entraining and squeezing of the mixed dough or semi viscous material. As an example when viewed in FIG. 3 the powered feed conveyor belt 14 will move from lower, right to upper left of Figure. The powered lower conveyor belt 14 will assist in the movement of mixed dough or semi viscous material 1 to go between the powered feed roller 5 and the powered lower conveyor belt 14 where some of dough or semi viscous medium will go thru the gap 5a. Thereafter the dough or semi viscous material will be further carried onwards on the powered feed conveyor belt 14 upwards to the discharge point of the feed conveyor 13 and be removed from the powered feed conveyor belt 14 by the feed conveyor scraper 18A.

Further herein above, it was discussed that some of the dough or semi viscous material 1 will pass thru the gap or gap spacing 5A but there is also an amount of dough or semi viscous material 1 that does not squeeze down and pass thru the gap spacing 5A, as best seen in FIG. 3. The dough or semi viscous material 1 that does not go thru the feed roller to conveyor gap 5A will be deflected and moved upwards against the rotation of the feed roller and back towards the lower entry point of the hopper where the dough or semi viscous material is moved from and towards to be re-circulated and again entrained by the feed roller 5. This aids in maintaining a consistent feed of mixed dough or semi viscous material 1 to the area between the feed roller 5 and the powered lower conveyor belt 14 thru this area to the conveyor gap 5A and beyond to the discharge point of the powered lower feed conveyor belt 14. Also of note, if some of the dough or semi-viscous material 1 adheres to the conveyor belt 14 after the discharge point, the mixed dough or semi viscous material 1 goes around the feed conveyor discharge pulley 15. A scraper mounting plate 18 is located just below the lower or return side of the conveyor belt 14, on the underside of the conveyor bed 13A and the dough gets removed by the feed conveyor scraper 18A mounted thereon.

The inclination of the feed conveyor structure 13 further aids in this recirculation in the hopper 2 by allowing for the flow or rolling back of excess dough or semi viscous material 1 that was not able to pass thru the gap between the powered feed roller 5 and the powered lower feed conveyor belt 14 which is supported on or by support members 13A, 13B in the frame of the lower portion of the feed conveyor structure 13. This excess mixed dough or semi viscous material 1 will be motivated in part by a vector due to the inclination to flow or be moved around so as to re-approach the entrainment area of the powered feed roller 5 and powered lower feed conveyor belt 14. This re-feed of mixed dough or semi viscous material 1 flow direction will be opposed or restricted by the additional mixed dough or semi viscous material 1 flowing towards the powered feed/metering roller 5 due to the travel of the powered feed conveyor belt 14.

A further method of cleaning of the instant invention is provided herein. To clean the invention provision has been made to allow or present easy and convenient access to areas that require cleaning or where mixed dough or semi viscous material can enter and require proper sanitation so as to remove these materials. To provide cleaning access to the feeder in the method of cleaning an exemplary embodiment, one can remove the feed roller plate 11 by activating the feed roller removable plate release handles 11A then pulling the feed roller removable plate 11 away from the feed roller 5. Operators may find it useful to use handle opening in the feed roller removable plate 11 to aid in pulling this plate. Once the feed roller plate 11 has been removed the operator has full access to cleaning of the inside operating surface of the feed roller removable end plate 11 as well as the non profiled drive end of feed roller 5. Removal of the feed roller 5 can now be done by pulling on it so that it can slidably move outward from the feed roller stationary end plate 10 and feed hopper 2.

As noted in relation to FIG. 6, when removal of the powered feed conveyor belt 14 is required the flip actuator may be activated so that it will pull the flip section or feed conveyor flip nose 19 beyond its center of in-line pivot and continue to rotate to the open position so as to provide for significant slackening of the belt. The conveyor discharge scraper 18A may also be removed by first removing the removable scraper retention bracket 18 and at that point the belt may be slid off of the feed conveyor 13. Once the belt and/or the conveyor has been cleaned the powered feed conveyor belt 14 may be reinstalled onto the feed conveyor 13 and the feed conveyor flip nose 19 conveyor end may be rotated back upwards to the closed and or tension position by activating the conveyor flip nose pulley mount actuator 22 to rotate the flip section closed. It should be noted that the details of the flip conveyor section as well as removable discharge scraper are meant for illustrative purposes as to how an exemplary embodiment of the instant of the invention fully operates. Variations in the design of the combination of the feed roller to the feed conveyor belt with removable end plate for cleaning access can be accomplished and the specific steps in operation varied without departing from the spirit of the invention, which includes providing easy access to clean the elements of the invention.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A device for the controlled output feed of semi viscous mediums to a further processing device, the device comprising:
   a hopper retaining the semi-viscous medium;
   an at least one feed roller being in contact with the semi-viscous medium in the hopper and operating at a feed roller speed and direction;
   a conveyor belt separated from the feed roller by a gap spacing and rotating at a conveyor belt speed in the same direction as the feed roller;
   an at least one motor driving the at least one feed roller and the conveyor belt at the respective feed roller speed and the conveyor belt speed;
   a sensor sensing the volume of semi-viscous material;
   a gap space between the at least one feed roller and the conveyor belt allowing for the removal of the semi-viscous medium from the hopper as an output flow at a specified rate on the conveyor belt at a specified slab profile with a profile height; and
   a controller controlling the respective feed roller speed and the conveyor belt speed such that the at least one feed roller engages the semi-viscous material in the hopper and drives the material into the gap space between the feed roller and the conveyor belt to create a material feed output, wherein the adjustment of one or more of an at least one of the gap spacing, the speed of the at least one feed roller, and the speed of the conveyor provides at least two modes of operations for the output flow.

2. The device of claim 1, wherein the at least one roller is a plurality of rollers.

3. The device of claim 1, wherein the controller further comprises a human interface device with at least one adjustment control.

4. The device of claim 3, wherein the at least one adjustment control adjusts one or more of an at least one of the speed of the feed roller, the speed of the conveyor, and the gap spacing of the device to a setting.

5. The device of claim 4, wherein the controller further comprises a programmable logic controller adapted to store the setting for one or more of the at least one of the speed of the at least one roller, the speed of the conveyor and the gap spacing and memory.

6. The device of claim 1, wherein the first mode of an at least two modes reduces the semi-viscous material to a generally slab profile output that is generally uniform across the slab and of generally uniform profile height.

7. The device of claim 6, wherein in the first mode of an at least two modes, the speed of the feed roller and the speed of the conveyor are nearly equal and to provide the generally uniform slab.

8. The device of claim 6, wherein the second mode of an at least two modes reduces the semi-viscous material to a generally non-uniform slab.

9. The device of claim 8, wherein in the second mode of an at least two modes, the feed roller speed is varied from the conveyor speed and a difference between the adjusted feed roller speed and the conveyor speed results in the non-uniform slab output in the second of the at least two operating modes.

10. The device of claim 8, wherein in the second mode of an at least two modes, the conveyor speed is varied and a difference between the varied conveyor speed and the speed of the feed roller results in non-uniform slab output in the second of the at least two operating modes.

11. The device of claim 8, wherein in the second mode of an at least two modes, both the speed of the feed roller and the speed of the conveyor are varied and a difference between the speed of the conveyor and the speed of the feed roller results in the non-uniform slab output in the second of the at least two operating modes.

12. The device of claim 8, wherein the at least one motor includes two motors that provide for speed adjustment individually to the feed roller speed and the speed of the conveyor belt.

13. The device of claim 1, wherein the at least one sensor senses a low volume in the hopper of the further processing device and starts the device.

14. The device of claim 13, wherein the at least one sensor senses a high volume in the further device needing a consistent amount of semi-viscous medium or dough in the hopper in the further processing device and the signal stops the device.

15. The device of claim 13, wherein the sensor is on the further processing device being supplied by the device and the further processing device starts the device upon sensing a low volume and stops the device on sensing a high volume in a hopper of the further processing device.

16. The device of claim 1, wherein the gap space is adjustable.

17. The device of claim 16, wherein the adjustment of the gap spacing in combination with the variation of one or more of the speed of the conveyor, the speed of feed roller, and the speed of the feed roller and the conveyor determines whether the device is in a first of an at least two operational modes producing a uniform slab profile or a second of an at least two operating modes producing a non-uniform slab profile.

18. The device of claim 1, wherein the at least one feed roller is a movable at least one feed roller.

19. The device of claim 18, wherein the at least one movable feed roller has a profiled shape and is slideable upon a feed roller shaft.

20. The device of claim 1, further comprising a removable end plate comprising a wall of the hopper that allows for sanitation access.

* * * * *